US011369003B2

(12) United States Patent
Singh et al.

(10) Patent No.: US 11,369,003 B2
(45) Date of Patent: Jun. 21, 2022

(54) CONFIGURING NON-STANDALONE MODE FOR A MULTI-SUBSCRIBER IDENTITY MODULE USER EQUIPMENT

(71) Applicant: QUALCOMM Incorporated, San Diego, CA (US)

(72) Inventors: Gunbir Singh, Hyderabad (IN); Ajay Boddu, Hyderabad (IN); Akash Kumar, Hyderabad (IN); Ansah Ahmed Sheik, Hyderabad (IN); Vamsi Krishna Potti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 16/512,085

(22) Filed: Jul. 15, 2019

(65) Prior Publication Data

US 2021/0022209 A1 Jan. 21, 2021

(51) Int. Cl.
*H04W 88/06* (2009.01)
*H04B 1/3816* (2015.01)
*H04L 43/16* (2022.01)
*H04W 68/12* (2009.01)
*H04W 8/18* (2009.01)
*H04W 88/04* (2009.01)

(52) U.S. Cl.
CPC .......... *H04W 88/06* (2013.01); *H04B 1/3816* (2013.01); *H04L 43/16* (2013.01)

(58) Field of Classification Search
CPC .... H04W 88/06; H04W 88/08; H04B 1/3816; H04B 1/38; H04L 43/16
See application file for complete search history.

(56) References Cited

U.S. PATENT DOCUMENTS

| | | | | | |
|---|---|---|---|---|---|
| 6,134,437 | A | * | 10/2000 | Karabinis | .......... H04B 7/18563 455/12.1 |
| 9,042,250 | B2 | * | 5/2015 | Hou | ...................... H03G 3/3073 370/252 |
| 10,785,705 | B1 | * | 9/2020 | Rofougaran | .......... H04W 48/08 |

(Continued)

FOREIGN PATENT DOCUMENTS

| | | |
|---|---|---|
| EP | 2605558 A1 | 6/2013 |
| WO | WO-2018019882 A1 | 2/2018 |
| WO | WO-2018151799 A1 | 8/2018 |

OTHER PUBLICATIONS

International Search Report and Written Opinion—PCT/US2020/041433—ISAEPO—dated Dec. 15, 2020.

*Primary Examiner* — Jenee Holland
(74) *Attorney, Agent, or Firm* — Harrity & Harrity LLP

(57) ABSTRACT

Various aspects of the present disclosure generally relate to wireless communication. In some aspects, a user equipment (UE) may determine that the UE is operating using a first subscriber identity module (SIM) in a non-standalone mode associated with a first radio access technology (RAT) and a second RAT, and that a second SIM has been activated for the UE. The UE may determine, based at least in part on user input, whether to operate in a multi-SIM mode, where both the first SIM and the second SIM are active, or to operate in a single SIM mode where only the first SIM, and not the second SIM, is active. The UE may selectively deactivate the second SIM based at least in part on determining whether to operate in the multi-SIM mode or the single SIM mode. Numerous other aspects are provided.

24 Claims, 9 Drawing Sheets

(56) References Cited

U.S. PATENT DOCUMENTS

| | | | |
|---|---|---|---|
| 10,880,725 B2* | 12/2020 | Park | H04W 68/005 |
| 10,893,422 B2* | 1/2021 | Lai | H04W 52/0206 |
| 2008/0137621 A1* | 6/2008 | Bheda | H04W 24/04 |
| | | | 370/338 |
| 2010/0248782 A1* | 9/2010 | Cheon | H04B 1/3816 |
| | | | 455/558 |
| 2011/0117909 A1* | 5/2011 | Cao | H04W 48/18 |
| | | | 455/423 |
| 2011/0117964 A1* | 5/2011 | Luo | H04W 48/18 |
| | | | 455/558 |
| 2011/0217969 A1 | 9/2011 | Spartz et al. | |
| 2011/0312359 A1* | 12/2011 | Kolding | H04W 52/0206 |
| | | | 455/509 |
| 2013/0029720 A1* | 1/2013 | Clevorn | H04W 72/10 |
| | | | 455/552.1 |
| 2013/0130646 A1* | 5/2013 | Xiong | H04M 15/80 |
| | | | 455/407 |
| 2013/0150126 A1* | 6/2013 | Pattaswamy | H04W 76/34 |
| | | | 455/558 |
| 2013/0203438 A1* | 8/2013 | Shin | H04W 64/00 |
| | | | 455/456.1 |
| 2013/0237197 A1* | 9/2013 | Ruvalcaba | H04W 8/183 |
| | | | 455/418 |
| 2013/0303181 A1* | 11/2013 | Rajurkar | H04W 76/15 |
| | | | 455/452.1 |
| 2013/0337792 A1* | 12/2013 | Vanghi | H04W 4/16 |
| | | | 455/417 |
| 2014/0274006 A1* | 9/2014 | Mutya | H04W 4/16 |
| | | | 455/416 |
| 2014/0274201 A1* | 9/2014 | Sun | H04B 1/3827 |
| | | | 455/552.1 |
| 2014/0317734 A1* | 10/2014 | Valencia | G06F 21/316 |
| | | | 726/22 |
| 2014/0323117 A1* | 10/2014 | Holtmanns | H04W 8/22 |
| | | | 455/418 |
| 2015/0065132 A1* | 3/2015 | Ramkumar | H04W 52/0241 |
| | | | 455/435.3 |
| 2015/0126187 A1* | 5/2015 | Ponukumati | H04W 72/02 |
| | | | 455/434 |
| 2015/0237497 A1* | 8/2015 | Chen | H04W 8/183 |
| | | | 455/558 |
| 2015/0264640 A1* | 9/2015 | Feng | H04W 8/183 |
| | | | 455/558 |
| 2015/0289314 A1* | 10/2015 | Yang | H04W 56/0045 |
| | | | 455/552.1 |
| 2015/0296520 A1* | 10/2015 | Batchu | H04W 72/02 |
| | | | 455/434 |
| 2015/0334575 A1* | 11/2015 | Joshi | H04L 1/00 |
| | | | 370/329 |
| 2015/0341946 A1* | 11/2015 | Chong | H04W 24/08 |
| | | | 455/450 |
| 2015/0351009 A1* | 12/2015 | Patel | H04W 36/0083 |
| | | | 455/434 |
| 2016/0021660 A1* | 1/2016 | Krishnamurthy | G06F 9/5094 |
| | | | 455/452.1 |
| 2016/0088467 A1* | 3/2016 | Reddem | H04W 8/20 |
| | | | 455/418 |
| 2016/0134316 A1* | 5/2016 | Mohan | H04W 8/22 |
| | | | 455/558 |
| 2016/0149605 A1* | 5/2016 | Vecera | H04B 1/3816 |
| | | | 455/558 |
| 2016/0309407 A1* | 10/2016 | Ngai | H04L 43/16 |
| 2016/0323933 A1* | 11/2016 | Song | H04W 8/183 |
| 2016/0345244 A1* | 11/2016 | Chuttani | H04W 4/021 |
| 2016/0353516 A1* | 12/2016 | Rajurkar | H04W 76/28 |
| 2017/0034849 A1* | 2/2017 | Kanamarlapudi | H04L 1/1896 |
| 2017/0208603 A1* | 7/2017 | Goel | H04W 48/18 |
| 2017/0257858 A1* | 9/2017 | Jain | H04W 72/042 |
| 2017/0265114 A1* | 9/2017 | Sahu | H04W 48/18 |
| 2017/0359813 A1* | 12/2017 | Lee | H04W 52/0212 |
| 2018/0048413 A1* | 2/2018 | Liu | H04W 48/18 |
| 2018/0132146 A1* | 5/2018 | Lee | H04W 36/0007 |
| 2018/0132186 A1* | 5/2018 | Kumar | H04W 52/0261 |
| 2018/0160386 A1* | 6/2018 | Arumugam | H04W 48/16 |
| 2018/0176887 A1* | 6/2018 | Strobl | H04W 76/40 |
| 2018/0220329 A1* | 8/2018 | Arumugam | H04L 65/1073 |
| 2018/0324728 A1* | 11/2018 | Abedini | H04L 1/1819 |
| 2018/0343697 A1* | 11/2018 | Hsu | H04L 5/0091 |
| 2018/0368016 A1* | 12/2018 | Lee | H04B 17/318 |
| 2019/0053130 A1* | 2/2019 | Guo | H04W 56/003 |
| 2019/0069229 A1 | 2/2019 | Lee et al. | |
| 2019/0281011 A1* | 9/2019 | Pang | H04L 61/2061 |
| 2019/0387464 A1* | 12/2019 | Abdel Shahid | H04W 48/18 |
| 2020/0015303 A1* | 1/2020 | Tsai | H04W 76/15 |
| 2020/0068456 A1* | 2/2020 | Humbert | H04W 24/08 |
| 2020/0296638 A1* | 9/2020 | Tsai | H04W 36/0069 |

\* cited by examiner

CONFIGURING NON-STANDALONE MODE FOR A MULTI-SUBSCRIBER IDENTITY MODULE USER EQUIPMENT

FIELD OF THE DISCLOSURE

Aspects of the present disclosure generally relate to wireless communication and to techniques and apparatuses for configuring non-standalone mode for a multi-subscriber identity module (multi-SIM) user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a user equipment (UE), may include determining that the UE is operating using a first subscriber identity module (SIM) in a non-standalone mode associated with a first radio access technology (RAT) and a second RAT and that a second SIM has been activated for the UE; determining, based at least in part on user input, whether to operate in a multi-SIM mode where both the first SIM and the second SIM are active or to operate in a single SIM mode where only the first SIM, and not the second SIM, is active; and selectively deactivating the second SIM based at least in part on determining whether to operate in the multi-SIM mode or the single SIM mode.

In some aspects, a method of wireless communication, performed by a UE, may include determining that the UE is operating using a first SIM in a non-standalone mode associated with a first RAT and a second RAT and that a second SIM has been activated for the UE; determining that the first SIM and the second SIM are associated with a same network operator; and using a network connection associated with the first SIM to decode a page associated with the second SIM, wherein the first SIM operates in the non-standalone mode.

In some aspects, a UE for wireless communication may include memory and one or more processors operatively coupled to the memory. The memory and the one or more processors may be configured to determine that the UE is operating using a first SIM in a non-standalone mode associated with a first RAT and a second RAT and that a second SIM has been activated for the UE; determine, based at least in part on user input, whether to operate in a multi-SIM mode where both the first SIM and the second SIM are active or to operate in a single SIM mode where only the first SIM, and not the second SIM, is active; and selectively deactivate the second SIM based at least in part on determining whether to operate in the multi-SIM mode or the single SIM mode.

In some aspects, a UE for wireless communication may include memory and one or more processors operatively coupled to the memory. The memory and the one or more processors may be configured to determine that the UE is operating using a first SIM in a non-standalone mode associated with a first RAT and a second RAT and that a second SIM has been activated for the UE; determine that the first SIM and the second SIM are associated with a same network operator; and use a network connection associated with the first SIM to decode a page associated with the second SIM, wherein the first SIM operates in the non-standalone mode.

In some aspects, a non-transitory computer-readable medium may store one or more instructions for wireless communication. The one or more instructions, when executed by one or more processors of a UE, may cause the one or more processors to: determine that the UE is operating using a first SIM in a non-standalone mode associated with a first RAT and a second RAT and that a second SIM has been activated for the UE; determine, based at least in part on user input, whether to operate in a multi-SIM mode where both the first SIM and the second SIM are active or to operate in a single SIM mode where only the first SIM, and not the second SIM, is active; and selectively deactivate the second SIM based at least in part on determining whether to operate in the multi-SIM mode or the single SIM mode.

In some aspects, a non-transitory computer-readable medium may store one or more instructions for wireless communication. The one or more instructions, when executed by one or more processors of a UE, may cause the one or more processors to: determine that the UE is operating using a first SIM in a non-standalone mode associated with a first RAT and a second RAT and that a second SIM has been activated for the UE; determine that the first SIM and the second SIM are associated with a same network operator; and use a network connection associated with the first SIM to decode a page associated with the second SIM, wherein the first SIM operates in the non-standalone mode.

In some aspects, a UE (e.g., an apparatus) for wireless communication may include means for determining that the UE is operating using a first SIM in a non-standalone mode associated with a first RAT and a second RAT and that a second SIM has been activated for the UE; means for determining, based at least in part on user input, whether to operate in a multi-SIM mode where both the first SIM and the second SIM are active or to operate in a single SIM mode where only the first SIM, and not the second SIM, is active; and means for selectively deactivating the second SIM based at least in part on determining whether to operate in the multi-SIM mode or the single SIM mode.

In some aspects, a UE (e.g., an apparatus) for wireless communication may include means for determining that the UE is operating using a first SIM in a non-standalone mode associated with a first RAT and a second RAT and that a second SIM has been activated for the UE; means for determining that the first SIM and the second SIM are associated with a same network operator; and means for using a network connection associated with the first SIM to decode a page associated with the second SIM, wherein the first SIM operates in the non-standalone mode.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
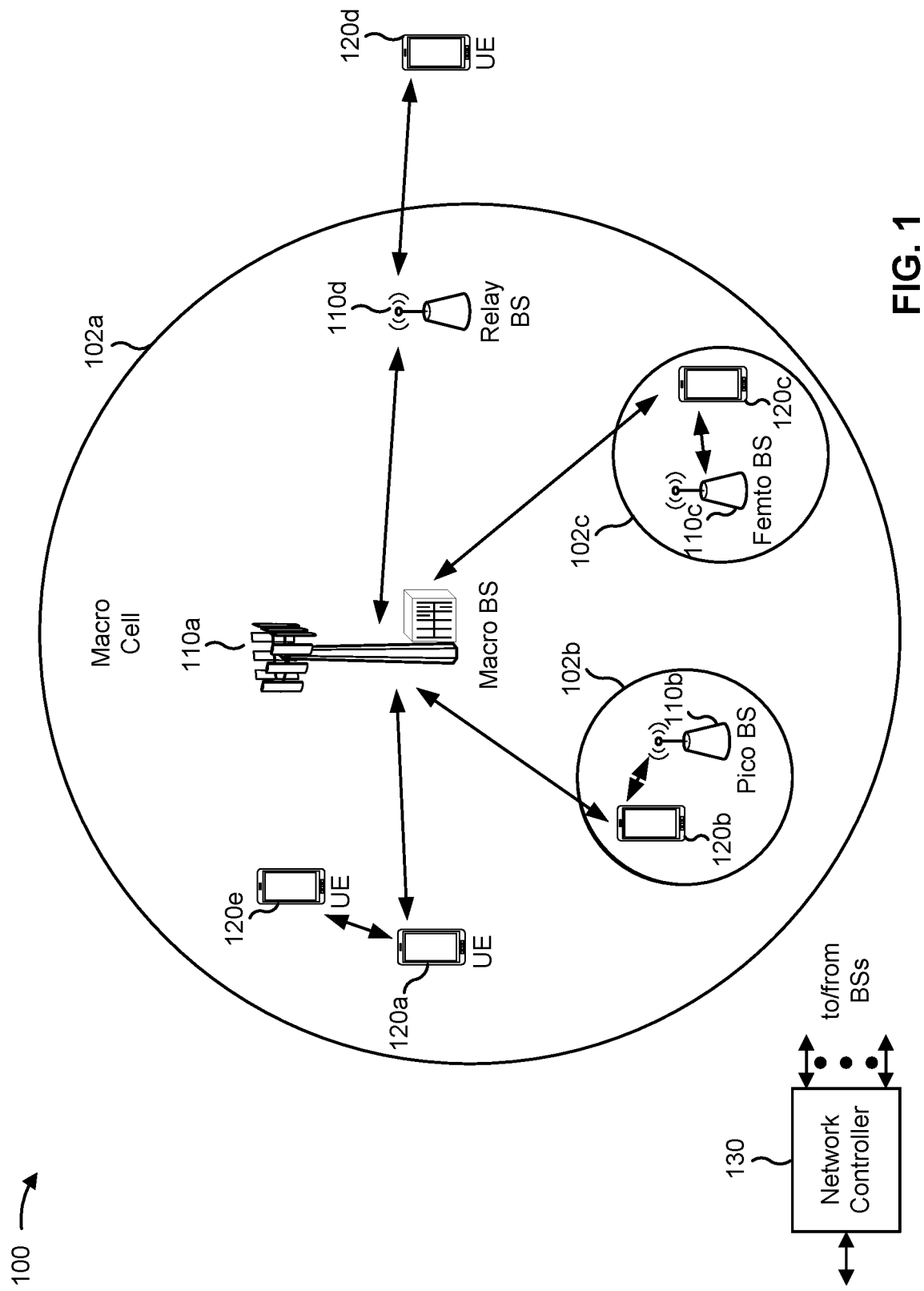
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing 284 that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
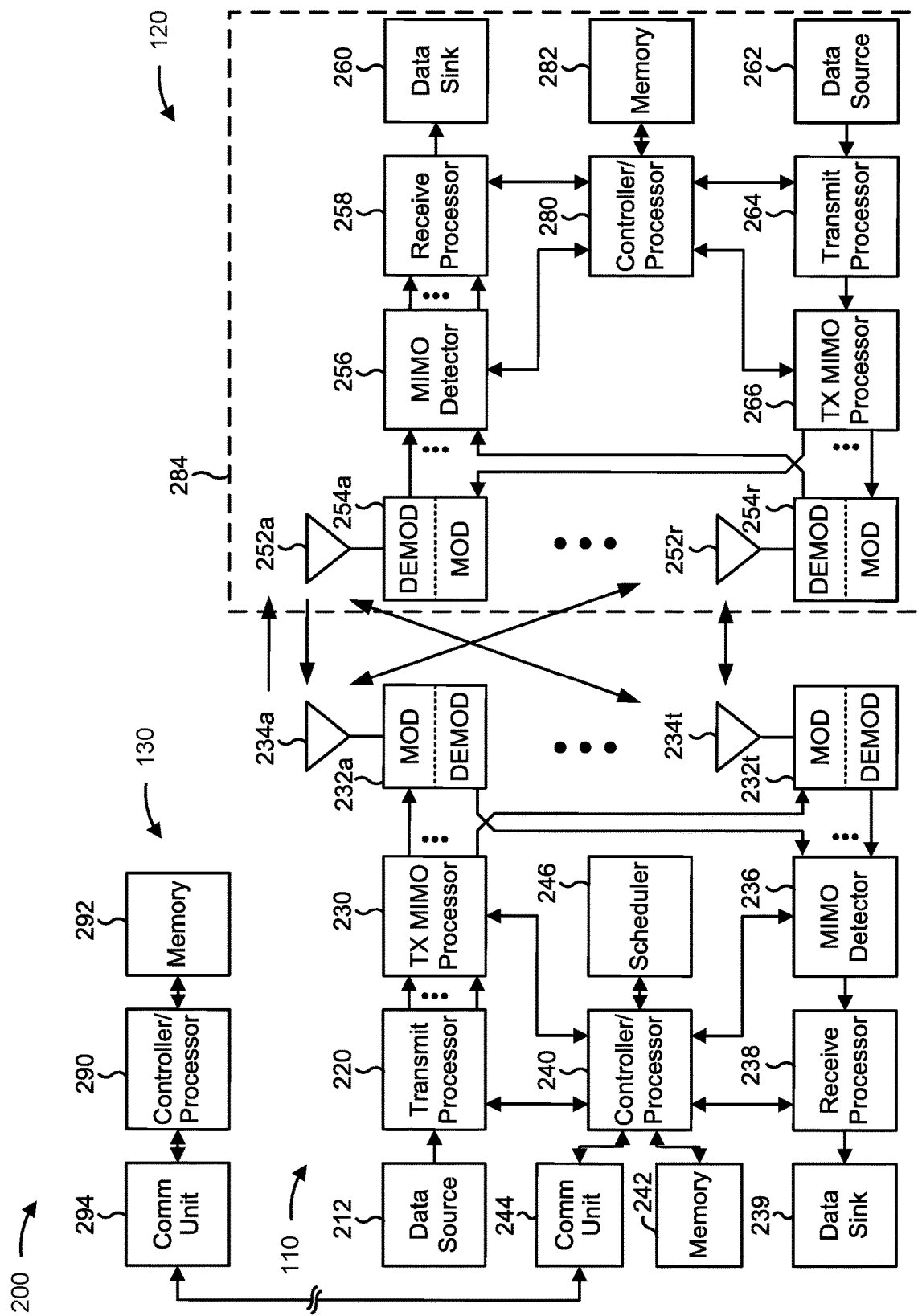
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring non-standalone mode for a multi-SIM UE, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for determining that the UE is operating using a first SIM in a non-standalone mode associated with a first RAT and a second RAT and that a second SIM has been activated for the UE; means for determining, based at least in part on user input, whether to operate in a multi-SIM mode where both the first SIM and the second SIM are active or to operate in a single SIM mode where only the first SIM, and not the second SIM, is active; means for selectively deactivating the second SIM based at least in part on determining whether to operate in the multi-SIM mode or the single SIM mode; and/or the like. Additionally, or alternatively, UE 120 may include means for determining that the UE is operating using a first SIM in a non-standalone mode associated with a first RAT and a second RAT and that a second SIM has been activated for the UE; means for determining that the first SIM and the second SIM are associated with a same network operator; means for using a network connection associated with the first SIM to decode a page associated with the second SIM, wherein the first SIM operates in the non-standalone mode; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
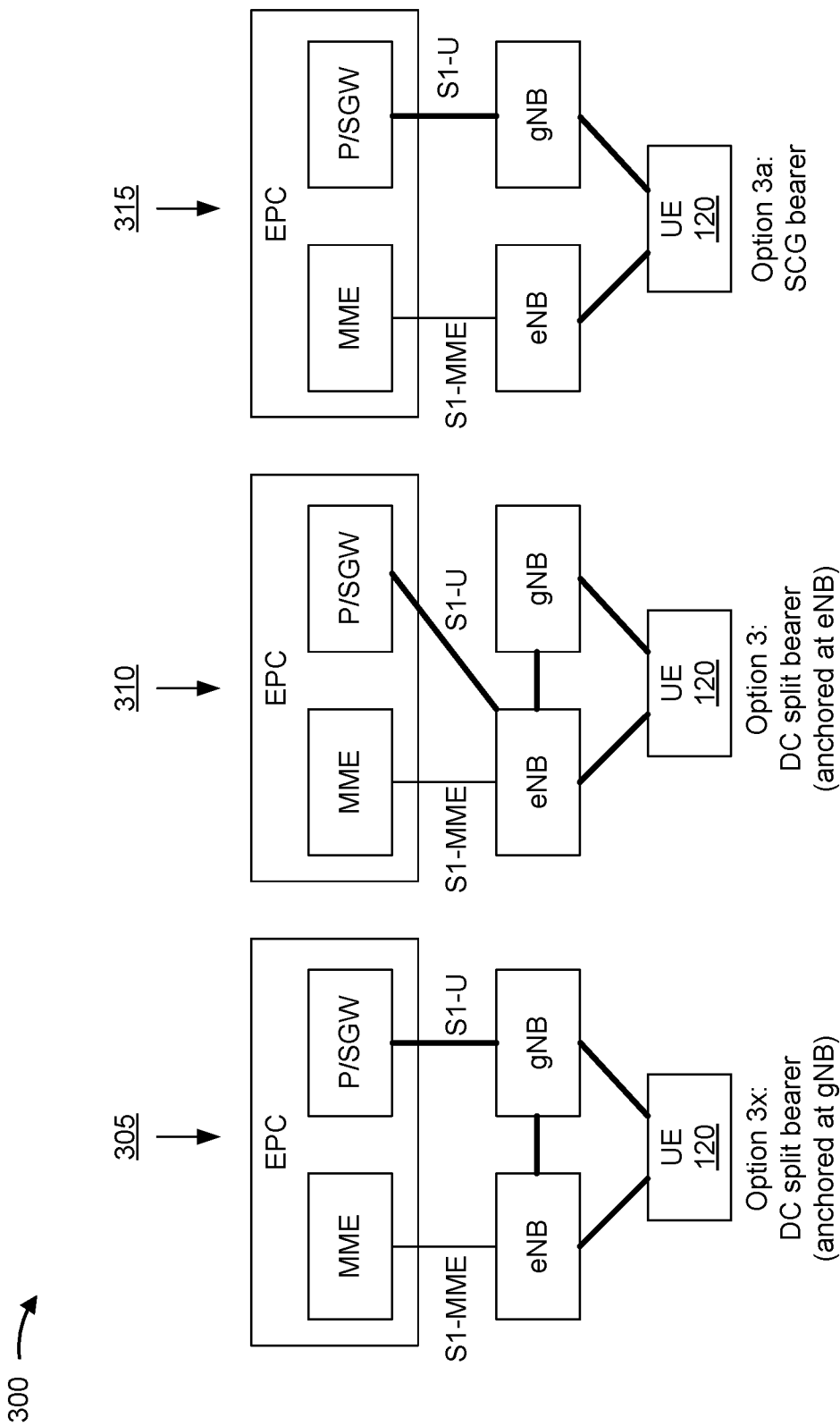
FIG. 3 is a diagram illustrating example 5G non-standalone (NSA) architectures, in accordance with various aspects of the present disclosure.

FIG. 3 is a diagram illustrating example 5G non-standalone (NSA) architectures 300, in accordance with various aspects of the present disclosure.

As shown in FIG. 3, in a 5G NSA mode, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network (PDN) gateway (PGW), a serving gateway (SGW), and/or the like. In FIG. 3, the PGW and the SGW are shown collectively as P/SGW.

As shown by reference number 305, in some aspects, a wireless network that permits operation in a 5G NSA mode may permit such operations using a first option (shown as option 3x) that uses dual connectivity with split bearers that are anchored at the gNB. In this case, the UE 120 may connect to both the eNB and the gNB using dual connectivity, and the gNB may aggregate and/or distribute traffic (e.g., data traffic) associated with the UE 120. In some aspects, the eNB may communicate with the MME in the 4G/LTE core network (e.g., via an S1-MME interface) to handle control plane information (e.g., non-access stratum messages and/or the like). Additionally, or alternatively, the gNB may communicate with the PGW and/or the SGW in the 4G/LTE core network (e.g., via an S1-U interface) to handle user plane information (e.g., data traffic and/or the like). In this case, the eNB may transmit user plane information to the gNB (e.g., for transmission to the 4G/LTE core network) and/or may receive user plane information from the gNB (e.g., for transmission to the UE 120).

As shown by reference number 310, in some aspects, a wireless network that permits operation in a 5G NSA mode may permit such operations using a second option (shown as option 3) that uses dual connectivity with split bearers that are anchored at the eNB. In this case, the UE 120 may connect to both the eNB and the gNB using dual connectivity, and the eNB may aggregate and/or distribute traffic (e.g., data traffic) associated with the UE 120. In some aspects, the eNB may communicate with the MME in the 4G/LTE core network (e.g., via an S1-MME interface) to handle control plane information (e.g., non-access stratum messages and/or the like), and may communicate with the PGW and/or the SGW in the 4G/LTE core network (e.g., via an S1-U interface) to handle user plane information (e.g., data traffic and/or the like). In this case, the gNB may transmit user plane information to the eNB (e.g., for transmission to the 4G/LTE core network) and/or may receive user plane information from the eNB (e.g., for transmission to the UE 120).

As shown by reference number 315, in some aspects, a wireless network that permits operation in a 5G NSA mode may permit such operations using a third option (shown as option 3a) that uses a secondary cell group (SCG) bearer. In this case, the UE 120 may communicate with the eNB via a master cell group, and may communicate with the gNB via the secondary cell group. In some aspects, the master cell group may anchor a network connection between the UE 120 and the 4G/LTE core network (e.g., for mobility, coverage, control plane information, and/or the like), and the secondary cell group may be added as additional carriers to increase throughput (e.g., for data traffic, user plane information, and/or the like). In this case, the gNB and the eNB may not transfer user plane information between one another.

As indicated above, FIG. 3 is provided as an example. Other examples may differ from what is described with regard to FIG. 3.

Figure 4:
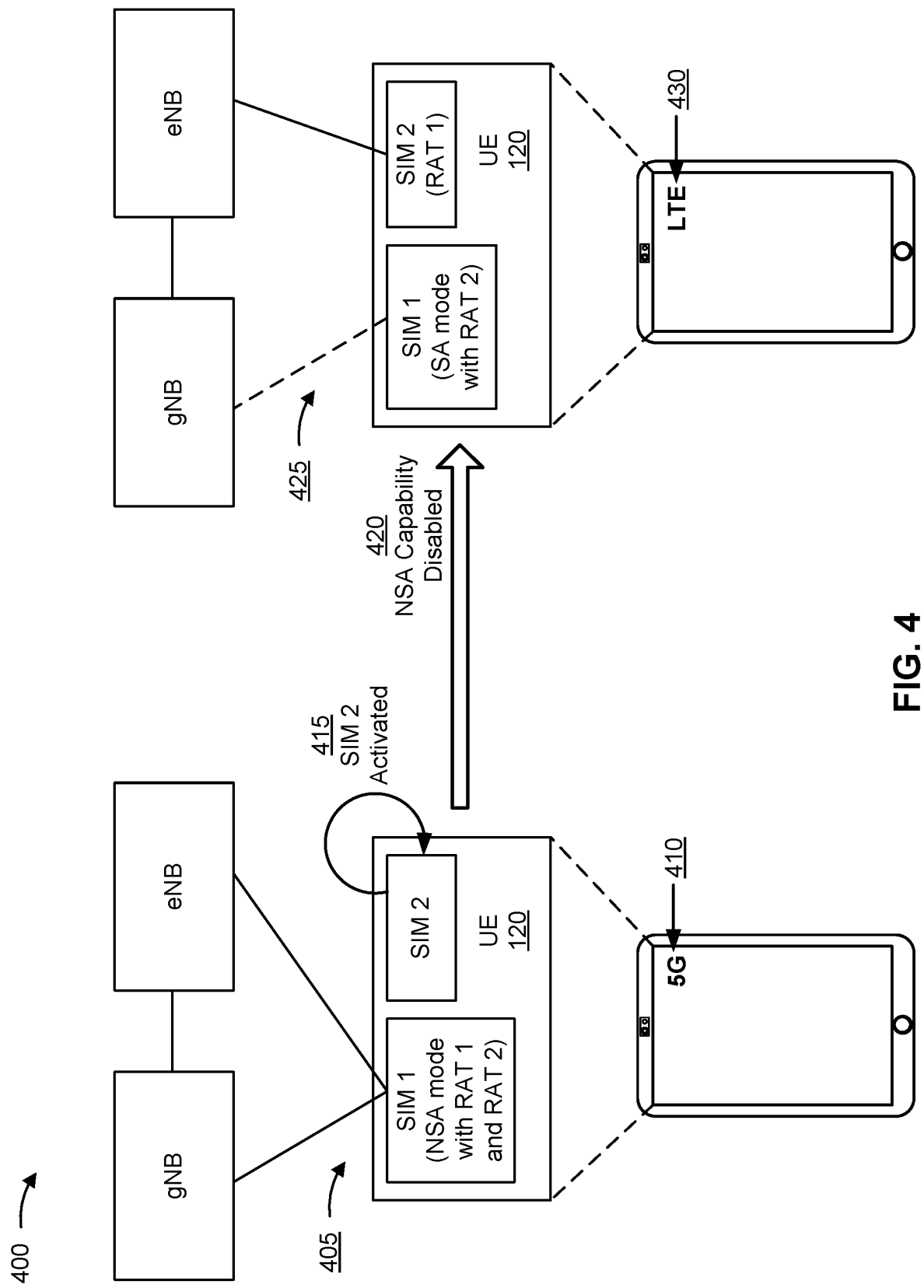
FIG. 4 is a diagram illustrating an example of removing an NSA capability upon activation of multiple subscriber identity modules (SIMs), in accordance with various aspects of the present disclosure.

FIG. 4 is a diagram illustrating an example 400 of removing an NSA capability upon activation of multiple subscriber identity modules (SIMs), in accordance with various aspects of the present disclosure. As shown in FIG. 4, a multi-SIM UE 120 may include more than one subscriber identity module (SIM), shown as SIM 1 and SIM 2. In some aspects, a multi-SIM UE 120 may include two or more SIMs.

As shown by reference number 405, a UE 120 may operate in an NSA mode (e.g., as described above in connection with FIG. 3) using a first SIM, shown as SIM 1. In the NSA mode, the first SIM may facilitate communications using a first radio access technology (RAT) (e.g., a 4G or LTE RAT, or a less advanced RAT) and a second RAT (e.g., a 5G or NR RAT, or a more advanced RAT). In FIG. 4, the first SIM (SIM 1) is shown as facilitating communications with both an eNB (e.g., a 4G base station 110) and a gNB (e.g., a 5G base station 110) in the NSA mode. As shown by reference number 410, in the NSA mode, the UE 120 may display an icon (shown as "5G") associated with the second RAT on a user interface of the UE 120, indicating that the UE 120 is connected to a base station 110 and/or a cell of the second RAT.

As shown by reference number 415, the second SIM (shown as SIM 2) may be activated. For example, the second SIM may be inserted into the UE 120 and activated. Additionally, or alternatively, the second SIM may be activated using software executing on the UE 120. The first SIM and/or the second SIM may be a removeable SIM or an embedded SIM.

As shown by reference number 420, when the second SIM is activated, the UE 120 may disable the NSA mode (e.g., an NSA capability that permits the UE 120 to communicate in the NSA mode). In this case, as shown by reference number 425, the first SIM may attempt to facilitate communications with the gNB in a 5G standalone (SA) mode, and the second SIM may facilitate communications with the eNB. However, in some cases, the first SIM may not be able to facilitate communications with the gNB in the SA mode, represented in FIG. 4 by the dashed line between SIM 1 and the gNB. For example, a 5G connection between the gNB and the UE 120 may be weak and/or unreliable, the UE 120 may not have an SA capability, the gNB may not have an SA capability, and/or the like. As a result, the UE 120 may operate using only the 4G RAT and not the 5G RAT, and may have reduced performance, such as lower throughput. In some cases, the NSA mode may be disabled upon activation of the second SIM even if the UE 120 is executing an application that requires high throughput (e.g., due to a user preference).

Furthermore, as shown by reference number 430, the UE 120 may remove an icon associated with the second RAT from a user interface of the UE 120, and may display an icon associated with the first RAT (shown as "LTE") on the user interface, indicating that the UE 120 is connected to a base station 110 and/or a cell of the first RAT (and not the second RAT). This may negatively impact user perception of the UE 120.

Some techniques and apparatuses described herein permit a 5G NSA connection to be maintained using the first SIM when the second SIM is activated. This may improve performance of the UE 120, particularly if the UE 120 is executing a data-intensive application. For example, maintaining the 5G NSA connection may reduce throughput for data communicated using the 5G RAT as compared to the 4G RAT. When the 5G NSA connection is maintained, a 5G icon may continue to be displayed on a user interface of the UE 120, thereby improving user perception of the UE 120 as compared to removing such an icon from a user interface of the UE 120.

As indicated above, FIG. 4 is provided as an example. Other examples may differ from what is described with regard to FIG. 4.

Figure 5:
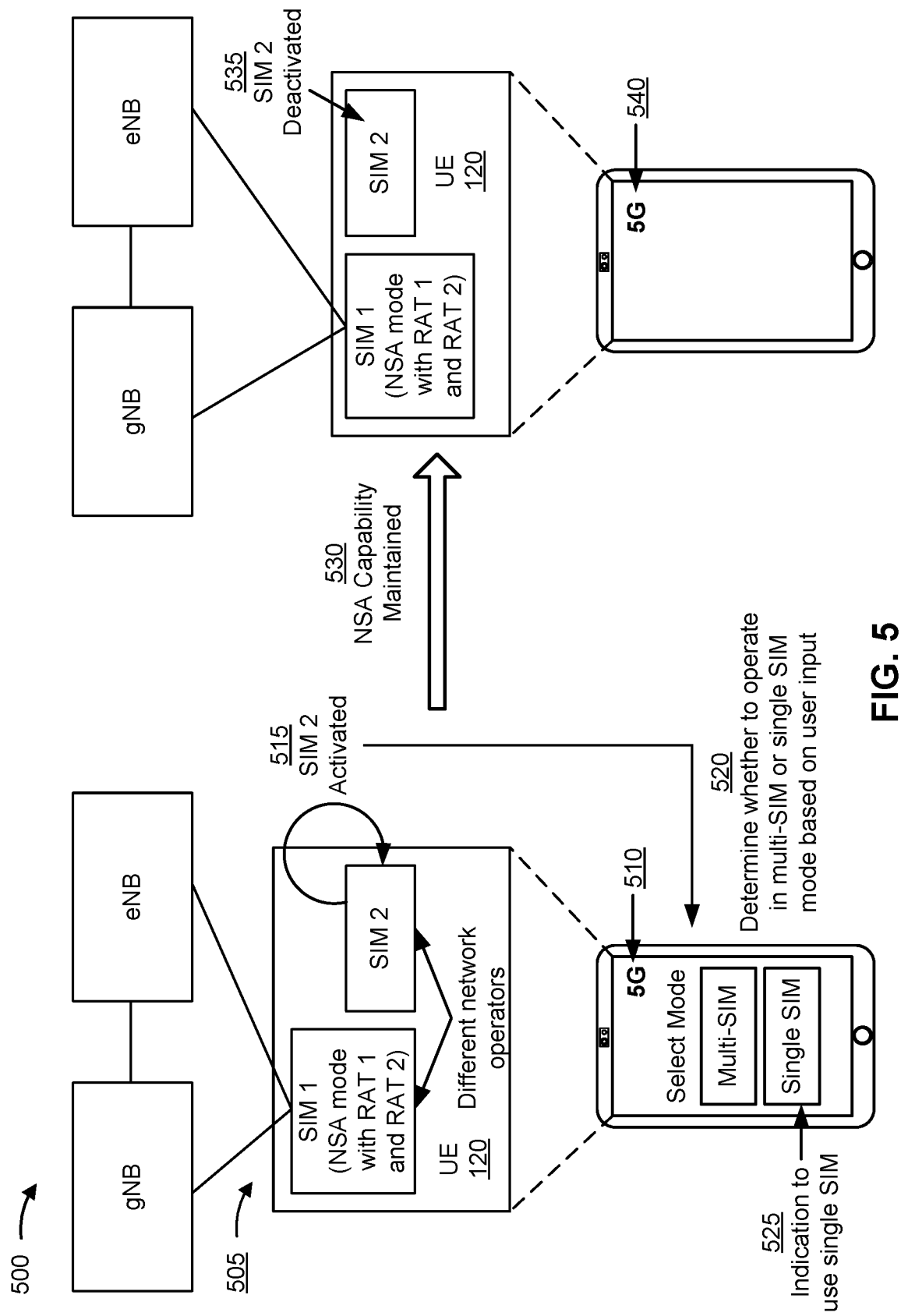
FIG. 5 is a diagram illustrating an example of configuring NSA mode for a multi-subscriber identity module (multi-SIM) UE, in accordance with various aspects of the present disclosure.

FIG. 5 is a diagram illustrating an example 500 of configuring an NSA mode for a multi-SIM UE, in accordance with various aspects of the present disclosure. As shown in FIG. 5, a multi-SIM UE 120 may include multiple SIMs, shown as SIM 1 and SIM 2.

As shown by reference number 505, the UE 120 may operate in an NSA mode (e.g., as described above in connection with FIG. 3) using a first SIM, shown as SIM 1. In the NSA mode, the first SIM (SIM 1) may facilitate communications using a first RAT (e.g., a 4G or LTE RAT, or a less advanced RAT) and a second RAT (e.g., a 5G or NR RAT, or a more advanced RAT). In FIG. 5, the first SIM is shown as facilitating communications with both an eNB (e.g., a 4G base station 110) and a gNB (e.g., a 5G base station 110) in the NSA mode. The UE 120 may determine that the UE 120 is operating in the NSA mode using the first SIM. In example 500, the first SIM and the second SIM are associated with different network operators (e.g., different mobile network operators). In some aspects, the UE 120 may determine that the first SIM and the second SIM are associated with different network operators, and may perform one or more operations described in connection with FIG. 5 based at least in part on the determination.

As shown by reference number 510, in the NSA mode, the UE 120 may display an icon (shown as "5G") associated with the second RAT on a user interface of the UE 120, indicating that the UE 120 is connected to a base station 110 and/or a cell of the second RAT.

As shown by reference number 515, the UE 120 may determine that a second SIM (shown as SIM 2) has been activated for the UE 120. For example, the UE 120 may detect that the second SIM has been inserted into the UE 120 and activated. Additionally, or alternatively, the UE 120 may detect that the second SIM has been activated using software executing on the UE 120. The first SIM and/or the second SIM may be a removeable SIM or an embedded SIM.

As shown by reference number 520, the UE 120 may determine whether to operate in a multi-SIM mode or a single SIM mode. In the multi-SIM mode, both the first SIM and the second SIM are active. In the single SIM mode, only one of the SIMs (e.g., the first SIM) is active, and the other SIM (e.g., the second SIM) is not active (e.g., is deactivated). The UE 120 may selectively deactivate the second SIM based at least in part on determining whether to operate in the multi-SIM mode or the single SIM mode. For example, in example 500, the UE 120 determines to operate in the single SIM mode and deactivates the second SIM based at least in part on this determination. In some aspects, the UE 120 may determine whether to operate in a multi-SIM mode or a single SIM mode based at least in part on a determination that the first SIM and the second SIM are associated with different network operators.

In some aspects, the UE 120 may determine whether to operate in the multi-SIM mode or the single SIM mode based at least in part on user input. For example, as shown in FIG. 5, the UE 120 may output a request for user input, such as via a user interface of the UE 120. The request may permit user selection of whether to operate in the multi-SIM mode or the single SIM mode. For example, the UE 120 may display, via a user interface, one or more input elements that permit the user to select whether to operate in the multi-SIM mode or the single SIM mode. The user may interact with an input element to select the multi-SIM mode or the single SIM mode. As shown by reference number 525, in example 500, the user interacts with the user interface of the UE 120 to indicate (e.g., select) the single SIM mode.

Although FIG. 5 shows the UE 120 outputting the request for user input based at least in part on determining that the second SIM has been activated, in some aspects, user input may be stored in memory of the UE 120. For example, the user may interact with a user interface of the UE 120 to indicate a user preference regarding whether to operate in the single SIM mode or the multi-SIM mode, and the UE 120 may store the user preference in memory. Based at least in part on determining that the second SIM has been activated, the UE 120 may obtain the user preference from the memory, and may determine whether to operate in the multi-SIM mode or the single SIM mode according to the user preference. In some aspects, the user may input one or more first conditions that, if satisfied, cause the UE 120 to operate in the single SIM mode (e.g., according to a user preference associated with the first condition(s)). Additionally, or alternatively, the user may input one or more second conditions that, if satisfied, cause the UE 120 to operate in the multi-SIM mode (e.g., according to a user preference associated with the second condition(s)). A first condition and/or a second condition may include one or more conditions described below.

In some aspects, the UE 120 may determine whether to operate in the multi-SIM mode or the single SIM mode based at least in part on a condition. The condition may relate to an application executing on the UE 120, a volume of data traffic associated with the UE 120, a quality of a network connection between the UE 120 and one or more base stations 110 (e.g., a base station of the first RAT and/or a base station of the second RAT), and/or the like.

For example, the UE 120 may determine a threshold volume of data traffic (e.g., in a time period) associated with the UE 120 (e.g., a volume of data transmitted and/or received by the UE 120, a volume of data scheduled for the UE 120, and/or the like). If the volume of data traffic satisfies the threshold (e.g., is greater than or equal to the threshold), then the UE 120 may determine to operate in the single SIM mode to improve throughput for the high volume of data traffic. If the volume of data traffic does not satisfy the threshold (e.g., is less than or equal to the threshold), then the UE 120 may determine to operate in the multi-SIM mode, as described in more detail below in connection with FIG. 6.

As another example, the UE 120 may determine whether a particular type of application is executing on the UE 120, such as an application associated with high data throughput (e.g., a gaming application, a video streaming application, an augmented reality application, and/or the like). If the particular type of application is executing on the UE 120, then the UE 120 may determine to operate in the single SIM mode to improve throughput for the application. If the particular type of application is not executing on the UE 120, then the UE 120 may determine to operate in the multi-SIM mode, as described in more detail below in connection with FIG. 6.

As another example, the UE 120 may determine whether a serving cell of the UE 120 supports the NSA mode (e.g., for the first RAT and the second RAT). For example, the UE 120 may determine whether the serving cell supports the NSA mode based at least in part on system information (e.g., a system information block (SIB), such as SIB2) of the serving cell. If the serving cell supports the NSA mode, then the UE 120 may determine to operate in the single SIM mode by maintaining the NSA capability. If the serving cell does not support the NSA mode, then the UE 120 may determine to operate in the multi-SIM mode, as described in more detail below in connection with FIG. 6.

As another example, the UE 120 may determine whether the first SIM and the second SIM are associated with the same network operator. If the first SIM and the second SIM are associated with the same network operator, then the UE 120 may determine to operate in the single SIM mode, as described in more detail below in connection with FIG. 7. In some aspects, if the first SIM and the second SIM are associated with different network operators, then the UE 120 may determine to operate in the multi-SIM mode. Alternatively, if the first SIM and the second SIM are associated with different network operators, then the UE 120 may use additional information (e.g., user input, a user preference, an additional condition, and/or the like) to determine whether to operate in the multi-SIM mode or the single SIM mode.

In some aspects, multiple conditions described above may be used in combination with one another. For example, the UE 120 may determine whether to operate in the single SIM mode or the multi-SIM mode based at least in part on multiple conditions. In some aspects, the UE 120 may determine whether to operate in the single SIM mode or the multi-SIM mode based at least in part on one or more conditions without requesting user input (and/or using a user preference). In some aspects, the UE 120 may determine whether to operate in the single SIM mode or the multi-SIM mode based at least in part on one or more conditions and based at least in part on the user input (and/or a user preference).

As shown by reference number 530, based at least in part on a determination to operate in the single SIM mode, the UE 120 may maintain an NSA capability for the first SIM. In this case, the first SIM may continue to operate in the NSA mode. As shown by reference number 535, based at least in part on the determination to operate in the single SIM mode, the UE 120 may deactivate the second SIM. In this way, performance of the UE 120 may be improved, such as by avoiding a throughput reduction using the 5G RAT in the NSA mode as compared to using the 4G RAT.

In some aspects, when the UE 120 maintains the NSA capability for the first SIM, the UE 120 may forward, to another UE 120 (e.g., an IoT UE, a personal IoT UE, a wearable UE, a smart watch, and/or the like), communications associated with the second SIM. For example, the UE 120 may determine that the UE 120 has a connection with another UE 120 (e.g., a personal area network (PAN) connection, a wireless PAN (WPAN) connection, a WLAN connection, and/or the like). In this case, the UE 120 may receive a page associated with the second SIM. The UE 120 may forward the page to the other UE 120. In some aspects, the UE 120 may receive the page via a network connection of the first SIM. In this way, network performance may be improved by reducing the likelihood of a missed page.

As shown by reference number 540, the UE 120 may continue to display an icon (shown as "5G") associated with the second RAT based at least in part on the determination to operate in the single SIM mode. For example, because the first SIM is operating in the NSA mode with the 4G RAT and the 5G RAT, the UE 120 may continue to display an indication that the UE 120 is operating using the 5G RAT. In this way, a user perception of the UE 120 may be improved and the UE 120 may accurately indicate a RAT being used for communications of the UE 120.

As indicated above, FIG. 5 is provided as an example. Other examples may differ from what is described with regard to FIG. 5.

Figure 6:
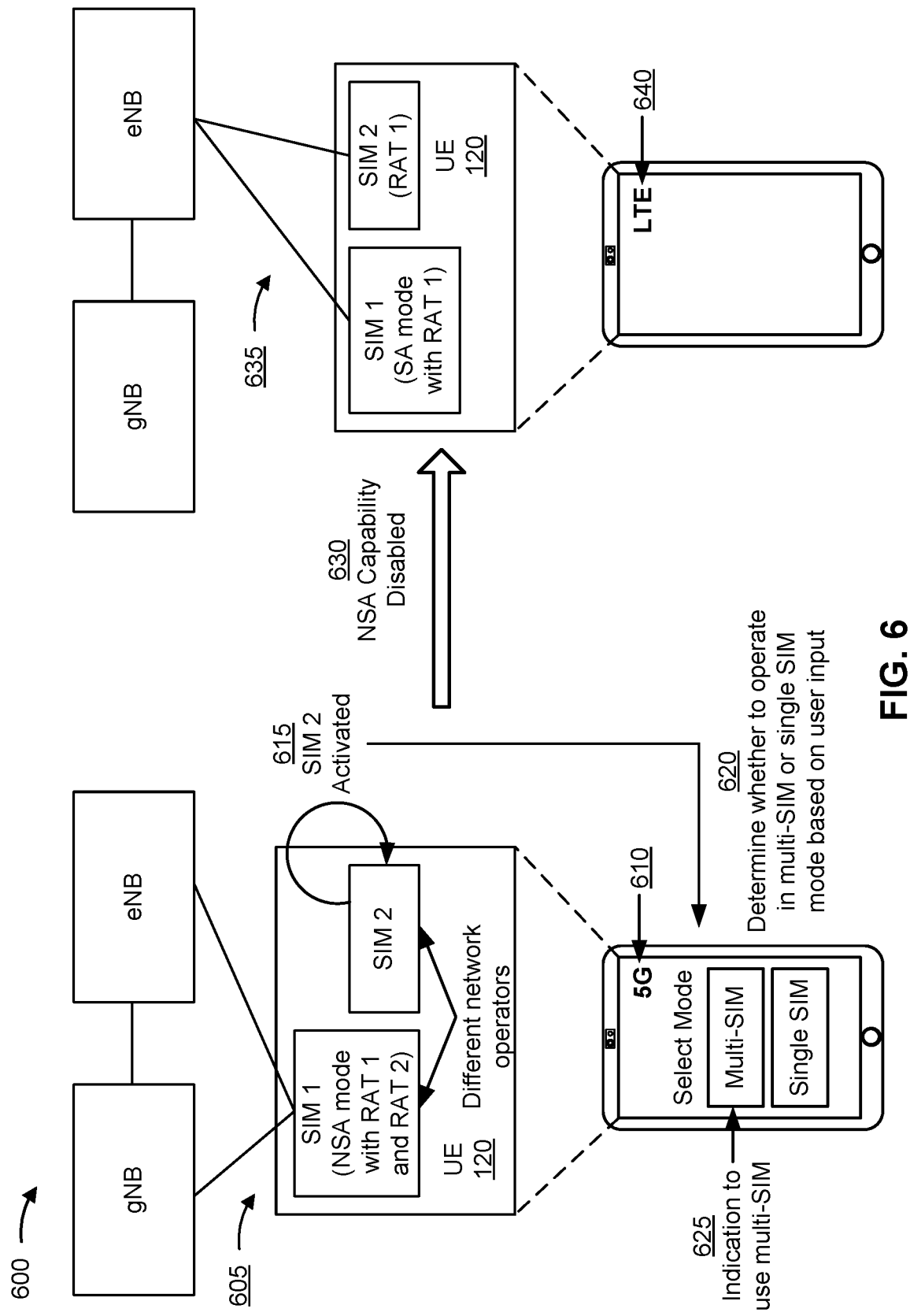
FIG. 6 is a diagram illustrating another example of configuring NSA mode for a multi-SIM UE, in accordance with various aspects of the present disclosure.

FIG. 6 is a diagram illustrating another example 600 of configuring an NSA mode for a multi-SIM UE, in accordance with various aspects of the present disclosure. As shown in FIG. 6, a multi-SIM UE 120 may include multiple SIMs, shown as SIM 1 and SIM 2.

As shown by reference number 605, the UE 120 may operate in an NSA mode using a first SIM (shown as SIM 1), as described above in connection with FIG. 5. The UE 120 may determine that the UE 120 is operating in the NSA mode using the first SIM. In example 600, the first SIM and the second SIM are associated with different network operators. In some aspects, the UE 120 may determine that the first SIM and the second SIM are associated with different network operators, and may perform one or more operations described in connection with FIG. 6 based at least in part on the determination.

As shown by reference number 610, in the NSA mode, the UE 120 may display an icon (shown as "5G") associated with the second RAT on a user interface of the UE 120, indicating that the UE 120 is connected to a base station 110 and/or a cell of the second RAT.

As shown by reference number 615, the UE 120 may determine that a second SIM (shown as SIM 2) has been activated for the UE 120, as described above in connection with FIG. 5. As shown by reference number 620, the UE 120 may determine whether to operate in a multi-SIM mode or a single SIM mode, as described above in connection with FIG. 5. The UE 120 may selectively deactivate the second SIM based at least in part on determining whether to operate in the multi-SIM mode or the single SIM mode. For example, in example 600, the UE 120 determines to operate in the multi-SIM mode and keeps the second SIM activated based at least in part on this determination.

In some aspects, the UE 120 may determine whether to operate in the multi-SIM mode or the single SIM mode based at least in part on user input, as described above in connection with FIG. 5. As shown by reference number 625, in example 600, the user interacts with the user interface of the UE 120 to indicate (e.g., select) the multi-SIM mode. Although FIG. 6 shows the UE 120 outputting the request for user input based at least in part on determining that the second SIM has been activated, in some aspects, user input may be stored in memory of the UE 120 (e.g., as a user preference), as described above in connection with FIG. 5. Additionally, or alternatively, the UE 120 may use one or more conditions described above in connection with FIG. 5 to determine to operate in the multi-SIM mode.

As shown by reference number 630, based at least in part on a determination to operate in the multi-SIM mode, the UE 120 may disable an NSA capability for the first SIM. In this case, the UE 120 may deactivate the NSA mode for the first SIM. As a result, the first SIM may operate using the first RAT (e.g., the 4G RAT). Furthermore, the UE 120 may keep the second SIM activated, as shown. In some aspects, if the UE 120 determines that the first SIM can operate in 5G SA mode (e.g., based at least in part on a capability of the UE 120, a capability of a base station 110, a network connection with the base station 110, and/or the like), then the UE 120 may switch the first SIM to the 5G SA mode, and may communicate with the gNB using the first SIM based at least in part on the determination to operate in the multi-SIM mode. Alternatively, as shown by reference number 635, based at least in part on the determination to operate in the multi-SIM mode, the UE 120 may use the first RAT (e.g., the 4G RAT) for the first SIM and the second SIM. In this way, the multi-SIM mode may be supported to permit communications associated with multiple subscriptions.

As shown by reference number 640, the UE 120 may display an icon (shown as "LTE") associated with the first RAT based at least in part on the determination to operate in the multi-SIM mode. For example, because neither SIM is operating using the 5G RAT, the UE 120 may remove an icon associated with the 5G RAT, and may display an indication that the UE 120 is operating using the 4G RAT. In this way, the UE 120 may accurately indicate a RAT being used for communications of the UE 120.

As indicated above, FIG. 6 is provided as an example. Other examples may differ from what is described with regard to FIG. 6.

Figure 7:
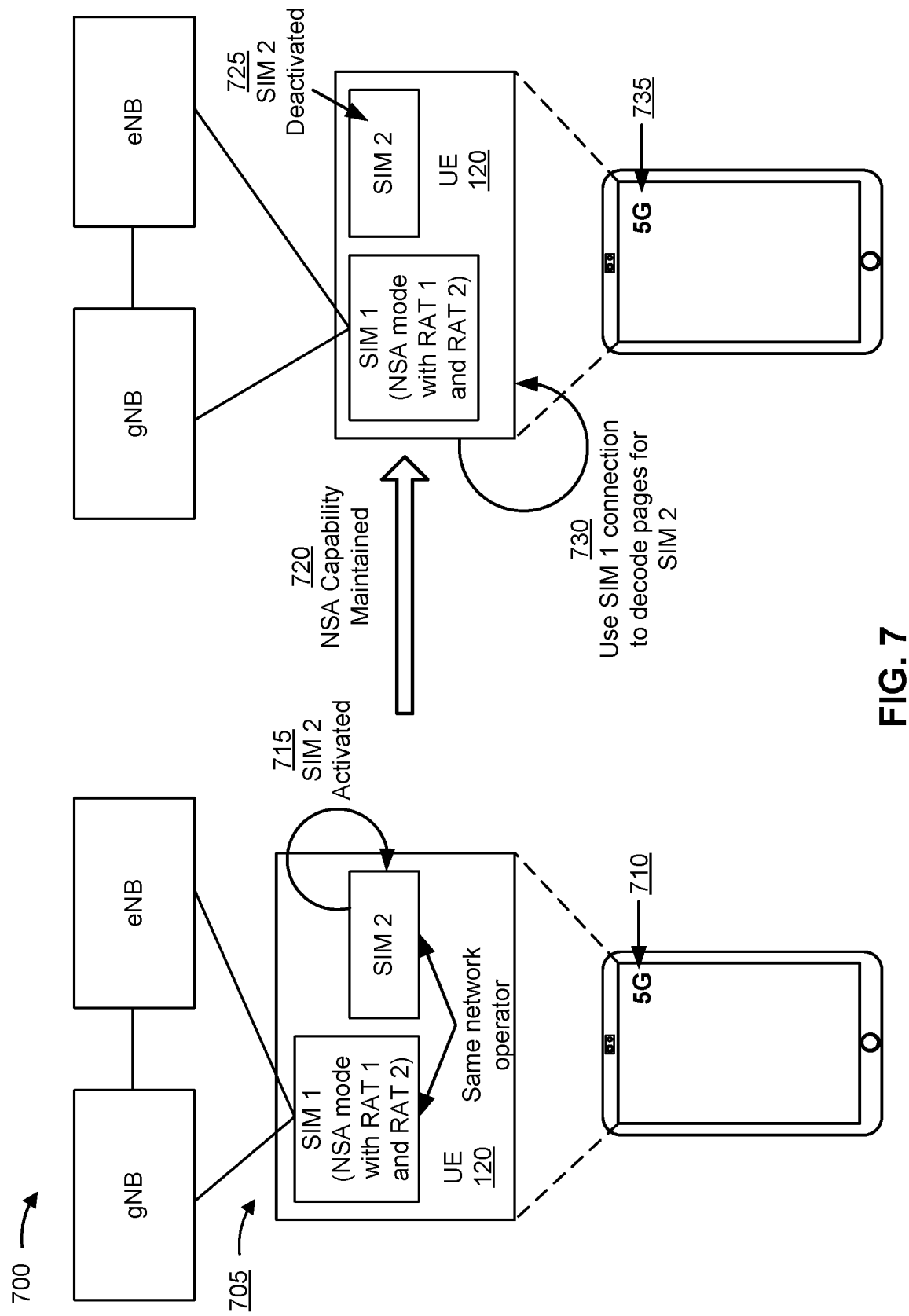
FIG. 7 is a diagram illustrating another example of configuring NSA mode for a multi-SIM UE, in accordance with various aspects of the present disclosure.

FIG. 7 is a diagram illustrating another example 700 of configuring an NSA mode for a multi-SIM UE, in accordance with various aspects of the present disclosure. As shown in FIG. 7, a multi-SIM UE 120 may include multiple SIMs, shown as SIM 1 and SIM 2.

As shown by reference number 705, the UE 120 may operate in an NSA mode using a first SIM (shown as SIM 1), as described above in connection with FIG. 5. The UE 120 may determine that the UE 120 is operating in the NSA mode using the first SIM. In example 700, the first SIM and the second SIM are associated with the same network operator. In some aspects, the UE 120 may determine that the first SIM and the second SIM are associated with the same network operator, and may perform one or more operations described in connection with FIG. 7 based at least in part on this determination.

As shown by reference number 710, in the NSA mode, the UE 120 may display an icon (shown as "5G") associated with the second RAT on a user interface of the UE 120, indicating that the UE 120 is connected to a base station 110 and/or a cell of the second RAT.

As shown by reference number 715, the UE 120 may determine that a second SIM (shown as SIM 2) has been activated for the UE 120, as described above in connection with FIG. 5. As shown by reference number 720, based at least in part on a determination that the first SIM and the second SIM are associated with a same network operator, the UE 120 may maintain an NSA capability for the first SIM when the second SIM is activated. In this case, the first SIM may continue to operate in the NSA mode. As shown by reference number 735, based at least in part on the determination that the first SIM and the second SIM are associated with a same network operator, the UE 120 may deactivate the second SIM after determining that the second SIM has been activated. In this way, performance of the UE 120 may be improved, such as by avoiding a throughput reduction using the 5G RAT in the NSA mode as compared to using the 4G RAT.

As shown by reference number 730, when the UE 120 maintains the NSA capability for the first SIM, the UE 120 may use a network connection associated with the first SIM to receive and/or decode pages associated with the second SIM. In this case, the UE 120 may receive a page associated with the second SIM. In some aspects, if the page is a high priority page (e.g., associated with a voice call and/or the like), then the UE 120 may switch to the second SIM to receive a communication associated with the high priority page. In this way, network performance may be improved by reducing the likelihood of a missed page.

As shown by reference number 735, the UE 120 may continue to display an icon (shown as "5G") associated with the second RAT based at least in part on the determination to operate in the single SIM mode. For example, because the first SIM is operating in the NSA mode with the 4G RAT and the 5G RAT, the UE 120 may continue to display an indication that the UE 120 is operating using the 5G RAT. In this way, a user perception of the UE 120 may be improved and the UE 120 may accurately indicate a RAT being used for communications of the UE 120.

As indicated above, FIG. 7 is provided as an example. Other examples may differ from what is described with regard to FIG. 7.

Figure 8:
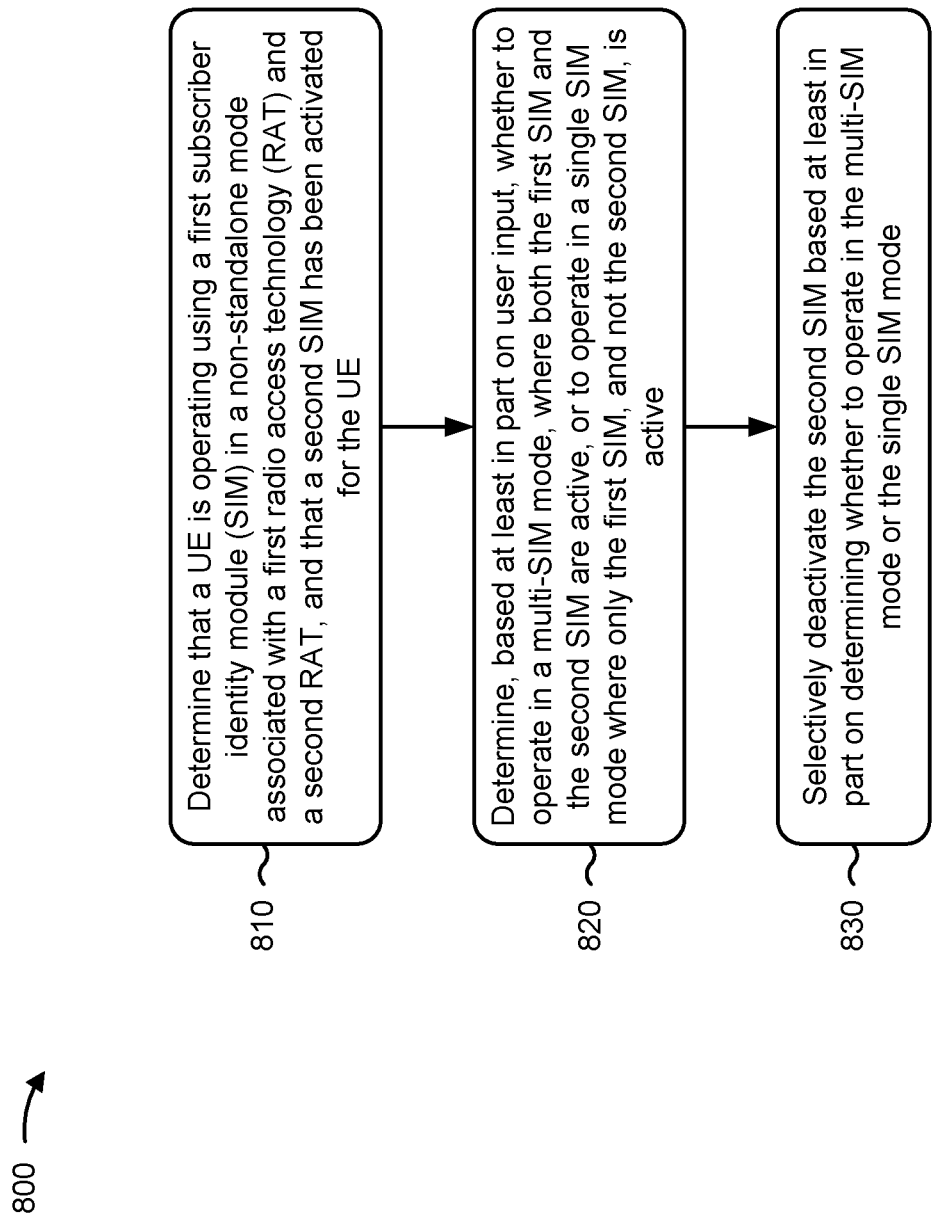
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with configuring an NSA mode for a multi-SIM UE.

As shown in FIG. 8, in some aspects, process 800 may include determining that the UE is operating using a first SIM in a non-standalone mode associated with a first RAT and a second RAT, and that a second SIM has been activated for the UE (block 810). For example, the UE (e.g., using receive processor 258, transmit processor 264, controller/processor 280, memory 282, and/or the like) may determine that the UE is operating using a first SIM in a non-standalone mode associated with a first RAT and a second RAT and that a second SIM has been activated for the UE, as described above.

As further shown in FIG. 8, in some aspects, process 800 may include determining, based at least in part on user input, whether to operate in a multi-SIM mode, where both the first SIM and the second SIM are active, or to operate in a single SIM mode where only the first SIM, and not the second SIM, is active (block 820). For example, the UE (e.g., using receive processor 258, transmit processor 264, controller/processor 280, memory 282, and/or the like) may determine, based at least in part on user input, whether to operate in a multi-SIM mode where both the first SIM and the second SIM are active, or to operate in a single SIM mode where only the first SIM, and not the second SIM, is active, as described above.

As further shown in FIG. 8, in some aspects, process 800 may include selectively deactivating the second SIM based at least in part on determining whether to operate in the multi-SIM mode or the single SIM mode (block 830). For example, the UE (e.g., using receive processor 258, transmit processor 264, controller/processor 280, memory 282, and/or the like) may selectively deactivate the second SIM based at least in part on determining whether to operate in the multi-SIM mode or the single SIM mode, as described above.

Process 800 may include additional aspects, such as any single aspect or any combination of aspects described below and/or in connection with one or more other processes described elsewhere herein.

In a first aspect, the non-standalone mode for the first SIM is deactivated, the first SIM operates using the first RAT, and the second SIM remains activated based at least in part on a determination that the user input indicates to operate in the multi-SIM mode.

In a second aspect, alone or in combination with the first aspect, the second SIM is deactivated and the first SIM operates in the non-standalone mode based at least in part on a determination that the user input indicates to operate in the single SIM mode.

In a third aspect, alone or in combination with one or more of the first and second aspects, process 800 includes determining that the UE has a connection with another UE;

receiving, via a network connection associated with the first SIM, a page associated with the second SIM; and routing the page to the other UE.

In a fourth aspect, alone or in combination with one or more of the first through third aspects, the first SIM and the second SIM are associated with different network operators.

In a fifth aspect, alone or in combination with one or more of the first through fourth aspects, process 800 includes outputting a request for the user input, and the request permits user selection of whether to operate in the multi-SIM mode or the single SIM mode; and receiving the user input based at least in part on outputting the request.

In a sixth aspect, alone or in combination with one or more of the first through fifth aspects, the user input includes a stored user preference.

In a seventh aspect, alone or in combination with one or more of the first through sixth aspects, process 800 includes determining that a serving cell of the UE, associated with the first RAT, supports non-standalone operation with the second RAT; and determining whether to operate in the multi-SIM mode or the single SIM mode based at least in part on determining that the serving cell supports the non-standalone operation.

In an eighth aspect, alone or in combination with one or more of the first through seventh aspects, process 800 includes determining that a condition, that indicates a threshold volume of data traffic associated with the UE, is satisfied; and determining whether to operate in the multi-SIM mode or the single SIM mode based at least in part on determining that the condition is satisfied.

In a ninth aspect, alone or in combination with one or more of the first through eighth aspects, an icon associated with the second RAT remains displayed on a display of the UE based at least in part on a determination that the user input indicates to operate in the single SIM mode.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
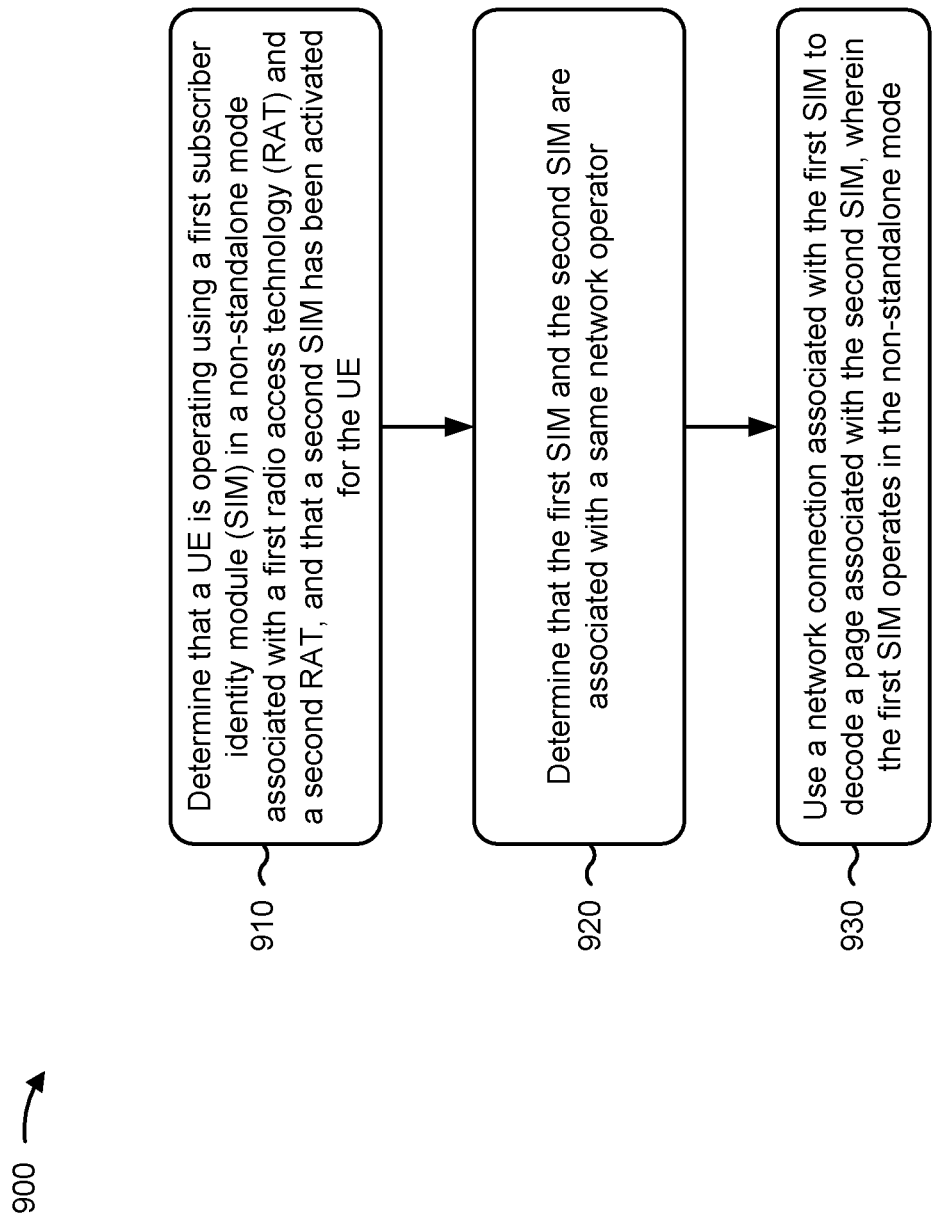
FIG. 9 is a diagram illustrating another example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with configuring an NSA mode for a multi-SIM UE.

As shown in FIG. 9, in some aspects, process 900 may include determining that the UE is operating using a first SIM in a non-standalone mode associated with a first RAT and a second RAT, and that a second SIM has been activated for the UE (block 910). For example, the UE (e.g., using receive processor 258, transmit processor 264, controller/processor 280, memory 282, and/or the like) may determine that the UE is operating using a first SIM in a non-standalone mode associated with a first RAT and a second RAT and that a second SIM has been activated for the UE, as described above.

As further shown in FIG. 9, in some aspects, process 900 may include determining that the first SIM and the second SIM are associated with a same network operator (block 920). For example, the UE (e.g., using receive processor 258, transmit processor 264, controller/processor 280, memory 282, and/or the like) may determine that the first SIM and the second SIM are associated with a same network operator, as described above.

As further shown in FIG. 9, in some aspects, process 900 may include using a network connection associated with the first SIM to decode a page associated with the second SIM, wherein the first SIM operates in the non-standalone mode (block 930). For example, the UE (e.g., using receive processor 258, transmit processor 264, controller/processor 280, memory 282, and/or the like) may use a network connection associated with the first SIM to decode a page associated with the second SIM, as described above. In some aspects, the first SIM operates in the non-standalone mode.

Process 900 may include additional aspects, such as any single aspect or any combination of aspects described below and/or in connection with one or more other processes described elsewhere herein.

In one aspect, an icon associated with the second RAT remains displayed on a display of the UE based at least in part on determining that the first SIM and the second SIM are associated with the same network operator.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that the UE is operating using a first subscriber identity module (SIM) in a non-standalone mode associated with a first radio access technology (RAT) and a second RAT and that a second SIM has been activated for the UE;
   determining, based at least in part on user input, to operate in a single SIM mode where only the first SIM, and not the second SIM, is active;
   selectively deactivating the second SIM based at least in part on determining to operate in the single SIM mode; and
   maintaining a non-standalone capability, associated with the non-standalone mode, for the first SIM based at least in part on selectively deactivating the second SIM.

2. The method of claim 1, wherein the first SIM is configured to operate in the non-standalone mode.

3. The method of claim 1, further comprising:
   determining that the UE has a connection with another UE; and
   receiving, via a network connection associated with the first SIM, a page associated with the second SIM; and
   routing the page to the other UE.

4. The method of claim 1, further comprising:
   outputting a request for the user input, wherein the request permits user selection of whether to operate in a multi-SIM mode, where both the first SIM and the second SIM are active, or the single SIM mode; and
   receiving the user input based at least in part on outputting the request.

5. The method of claim 1, wherein the user input includes a stored user preference.

6. The method of claim 1, further comprising:
   determining that a serving cell of the UE, associated with the first RAT, supports non-standalone operation with the second RAT; and
   determining whether to operate in a multi-SIM mode, where both the first SIM and the second SIM are active, or the single SIM mode based at least in part on determining that the serving cell supports the non-standalone operation.

7. The method of claim 1, further comprising:
   determining that a condition, that indicates a threshold volume of data traffic associated with the UE, is satisfied; and
   determining whether to operate in a multi-SIM mode, where both the first SIM and the second SIM are active, or the single SIM mode based at least in part on determining that the condition is satisfied.

8. The method of claim 1, wherein an icon associated with the second RAT remains displayed on a display of the UE based at least in part on a determination that the user input indicates to operate in the single SIM mode.

9. The method of claim 1, wherein the first SIM and the second SIM are associated with different network operators.

10. The method of claim 1, further comprising:
    determining whether the first SIM and the second SIM are associated with a same network operator,
        wherein determining to operate in the single SIM mode comprises:
            determining, based at least in part on user input and based at least in part on determining whether the first SIM and the second SIM are associated with the same network operator, to operate in the single SIM mode.

11. A method of wireless communication performed by a user equipment (UE), comprising:
    determining that the UE is operating using a first subscriber identity module (SIM) in a non-standalone mode associated with a first radio access technology (RAT) and a second RAT and that a second SIM has been activated for the UE;
    deactivating the second SIM based at least in part on determining that the first SIM and the second SIM are associated with a same network operator; and
    using, based at least in part on deactivating the second SIM, a network connection, with another UE, to decode a page, associated with the second SIM, and to permit the first SIM to operate in the non-standalone mode.

12. The method of claim 11, wherein an icon associated with the second RAT remains displayed on a display of the UE based at least in part on the first SIM and the second SIM being associated with the same network operator.

13. A user equipment (UE) for wireless communication, comprising:
    a memory; and
    one or more processors coupled to the memory, the one or more processors configured to:
        determine that the UE is operating using a first subscriber identity module (SIM) in a non-standalone mode associated with a first radio access technology (RAT) and a second RAT and that a second SIM has been activated for the UE;
        determine, based at least in part on user input to operate in a single SIM mode where only the first SIM, and not the second SIM, is active;
        selectively deactivate the second SIM based at least in part on determining to operate in the single SIM mode; and
        maintain a non-standalone capability, associated with the non-standalone mode, for the first SIM based at least in part on selectively deactivating the second SIM.

14. The UE of claim 13, wherein the first SIM is configured to operate in the non-standalone mode.

15. The UE of claim 13, wherein the one or more processors are further configured to:
    determine that the UE has a connection with another UE; and
    receive, via a network connection associated with the first SIM, a page associated with the second SIM; and
    route the page to the other UE.

16. The UE of claim 13, wherein the one or more processors are further configured to output a request for the user input, wherein the request permits user selection of whether to operate in a multi-SIM mode, where both the first SIM and the second SIM are active, or the single SIM mode; and receive the user input based at least in part on outputting the request.

17. The UE of claim 13, wherein the user input includes a stored user preference.

18. The UE of claim 13, wherein the one or more processors are further configured to:

determine that a serving cell of the UE, associated with the first RAT, supports non-standalone operation with the second RAT; and determine whether to operate in a multi-SIM mode, where both the first SIM and the second SIM are active, or the single SIM mode based at least in part on determining that the serving cell supports the non-standalone operation.

19. The UE of claim 13, wherein the one or more processors are further configured to:

determine that a condition, that indicates a threshold volume of data traffic associated with the UE, is satisfied; and determine whether to operate in a multi-SIM mode, where both the first SIM and the second SIM are active, or the single SIM mode based at least in part on determining that the condition is satisfied.

20. The UE of claim 13, wherein an icon associated with the second RAT remains displayed on a display of the UE based at least in part on a determination that the user input indicates to operate in the single SIM mode.

21. The UE of claim 13, wherein the first SIM and the second SIM are associated with different network operators.

22. The UE of claim 13, wherein the one or more processors are further configured to:

determine whether the first SIM and the second SIM are associated with a same network operator, wherein to operate in the single SIM mode is further based at least in part on determining whether the first SIM and the second SIM are associated with the same network operator.

23. A user equipment (UE) for wireless communication, comprising:

a memory; and one or more processors coupled to the memory, the one or more processors configured to:

determine that the UE is operating using a first subscriber identity module (SIM) in a non-standalone mode associated with a first radio access technology (RAT) and a second RAT and that a second SIM has been activated for the UE;

deactivate the second SIM based at least in part on determining that the first SIM and the second SIM are associated with a same network operator; and use, based at least in part on deactivating the second SIM, a network connection, with another UE, to decode a page, associated with the second SIM and to permit the first SIM to operate in the non-standalone mode.

24. The UE of claim 23, wherein an icon associated with the second RAT remains displayed on a display of the UE based at least in part on determining that the first SIM and the second SIM are associated with the same network operator.

* * * * *